May 7, 1968 L. F. CARSON 3,381,434
GLASS DIVISION BAR

Filed Oct. 23, 1965 5 Sheets-Sheet 1

May 7, 1968   L. F. CARSON   3,381,434
GLASS DIVISION BAR
Filed Oct. 23, 1965   5 Sheets-Sheet 3
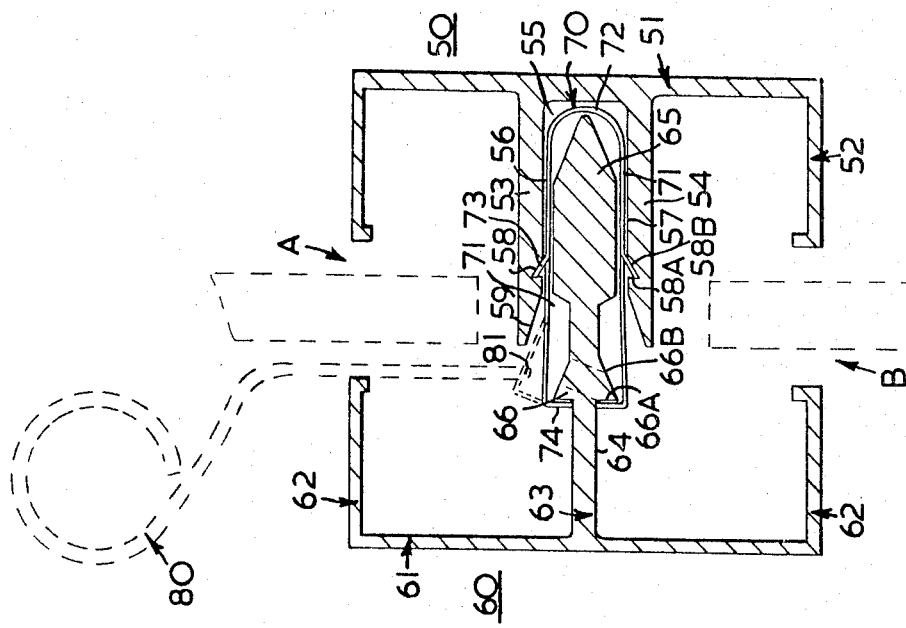
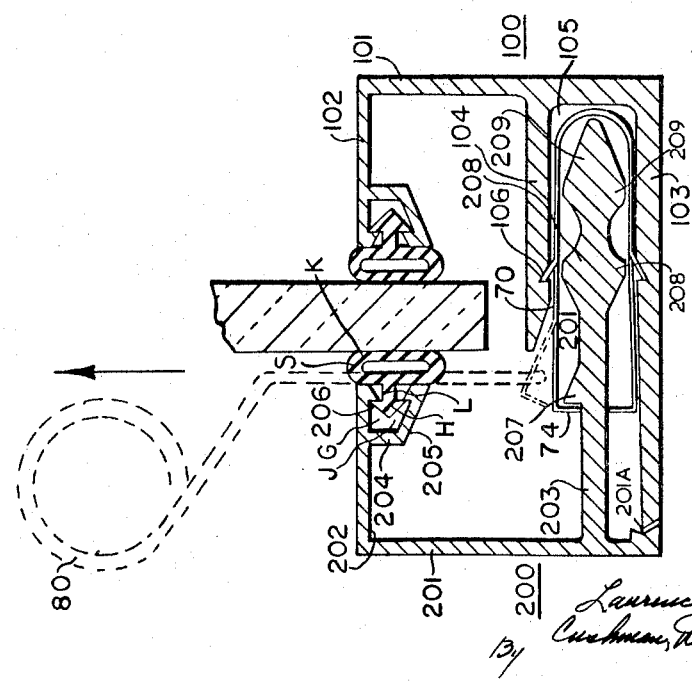
Inventor
Laurence F. Carson
By Cushman, Darby & Cushman
Attorneys May 7, 1968 L. F. CARSON 3,381,434
GLASS DIVISION BAR
Filed Oct. 23, 1965 5 Sheets-Sheet 4
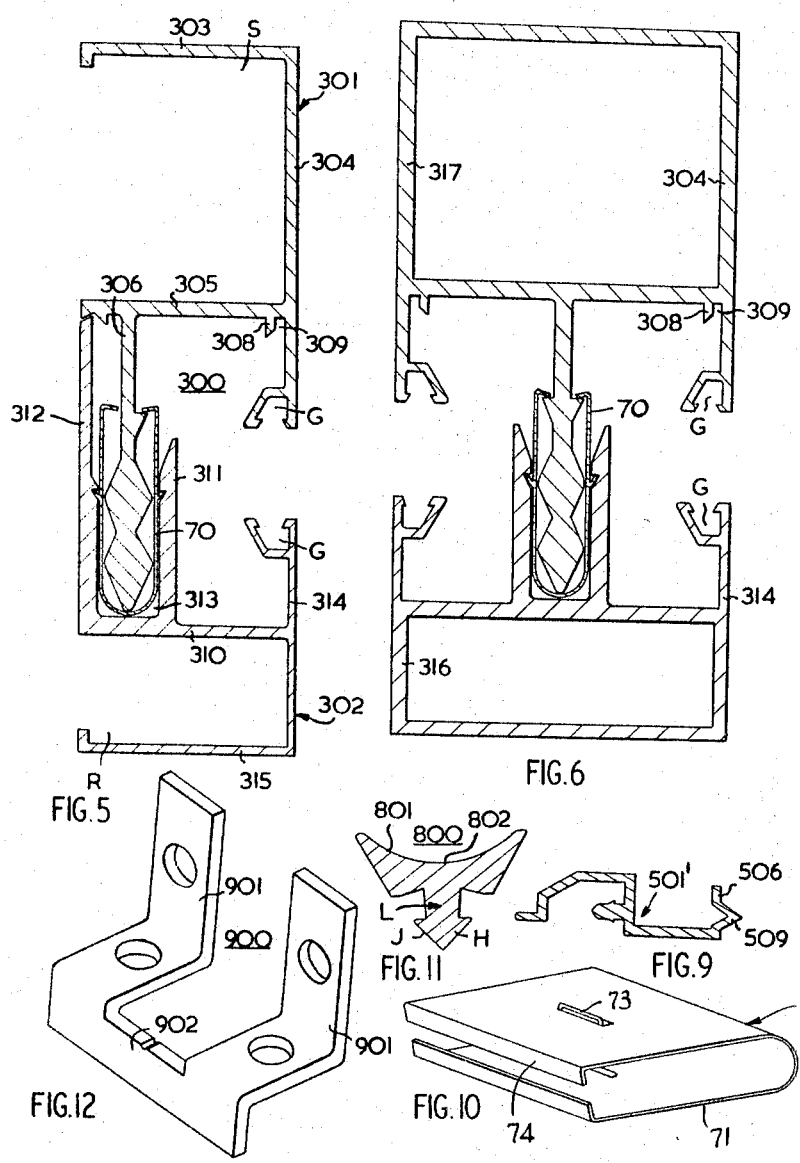

United States Patent Office 3,381,434
Patented May 7, 1968

3,381,434
GLASS DIVISION BAR
Laurence F. Carson, London, Ontario, Canada, assignor to Pittsburgh Plate Glass Company, Pittsburgh, Pa.
Filed Oct. 23, 1965, Ser. No. 503,000
Claims priority, application Canada, May 14, 1965, 930,671
15 Claims. (Cl. 52—397)

This invention relates to glass division bars and particularly to multipart division bars having concealed means detachably securing the parts together and also particularly to various components for glazing bars.

There are many known assemblies for retaining glass sheets by grasping a marginal edge thereof and these are commonly referred to as mullions, glass division or glazing bars. In many cases they are multipart assemblies having external fasteners in the form of screws or the like extending from one member to the other detachably securing them together in an assembled relation.

A common type of glazing bar consists of a pair of generally E-shaped in cross-section members having opposed marginal flanges disposed in spaced relation to provide a pair of glass receiving grooves and intermediate flanges located therebetween which are interconnected. The intermediate flanges are interconnected in various ways, and for this, reference may be had to U.S. Patent 2,917,793, issued Dec. 22, 1959, to H. L. Owens; U.S. Patent, 2,882,561, issued Apr. 21, 1959, to W. E. Shrode; U.S. Patent 2,901,785; issued Sept. 1, 1959, to E. D. Hinchliffe et al.; and Canadian Patent 692,319, issued Aug. 11, 1964, to S. E. Hubbard. In the structure illustrated in the first mentioned patent, the screws securing the members together are visible from one face. Visible fastening means is obviously undesirable.

Clips which are concealed have been used as exemplified by the above Canadian Patent 692,319. The present invention in one aspect is concerned with improvements in this latter type of fastening. Further aspects of the present invention concerns glazing bar components and various combinations thereof.

In glazing bars of the foregoing type, a major portion of one member is located exteriorly of the wall with a major portion of the other interiorly of the wall. Since the glazing bars are usually metal heat transfer in severe climates presents a problem. Metal being an excellent conductor of heat causes condensation to form on the warmer of the two members which is obviously annoying and undesirable.

Also in glazing bars presently available, there is no provision for varying the width of groove to accommodate various thicknesses of panels.

It is an object of the present invention to provide a multipart glazing bar wherein the parts are detachably secured by a clip interposed between the members and thus to some extent, thermally isolate the interiorly and exteriorly disposed members in an assembled wall.

It is a further object of the present invention to provide a multi-part glazing bar wherein the parts may be detachably secured together without the use of screws or other type of fastener visible externally of the members.

A still further object of the present invention is to provide a glazing bar including means selectively to vary the width of a panel receiving groove in at least one face thereof thereby adapted to receive and retain the marginal edge of various thicknesses of panels.

A still further object of the present invention is to provide a glazing bar component with a seal anchor urging a resilient seal into contact with a one face of a panel secured by the glazing bar in an assembled structure.

A still further object is to provide a seal for anchoring to a frame member and having a portion sealingly engageable with the planar surface of a panel.

In one aspect of the invention there is provided a glazing bar comprising a first rigid member having a web and a first flange projecting outwardly therefrom, a second rigid member having a web and a groove therein to receive an end portion of said first flange and a resilient clip interposed between and interconnecting said first and second rigid members.

In a further aspect of the invention there is provided a seal for a glazing bar having an end anchoring portion cooperating with a sloped surface in a seal anchoring groove normally to urge said seal into contact with a panel retained by said glazing bar.

The invention is illustrated by way of example in the accompanying drawings wherein:

FIG. 3 is a cross-sectional view of a further modified form;

FIG. 4 is a cross-sectional view illustrating a still further modified form of both the locking portion and the glazing bar;

FIG. 5 is a sectional view on an enlarged scale of a modified glazing bar;

FIG. 6 is a cross-sectional view of a still further modified form of a multi-part glazing bar in an assembled position;

FIG. 9 is a cross-sectional view of a glazing bar element adapted for use with glazing bars of the type illustrated in FIGS. 5 to 8 inclusive;

FIG. 10 is an oblique view of a clip for securing together the components of a glazing bar of the types illustrated in FIGS. 3 to 8 inclusive;

FIG. 11 is a cross-sectional view of a resilient sealing strip for use with a glazing bar; and FIG. 12 is an oblique of a clip for interconnecting a pair of glazing bars at right angles to one another.

Figure 1:
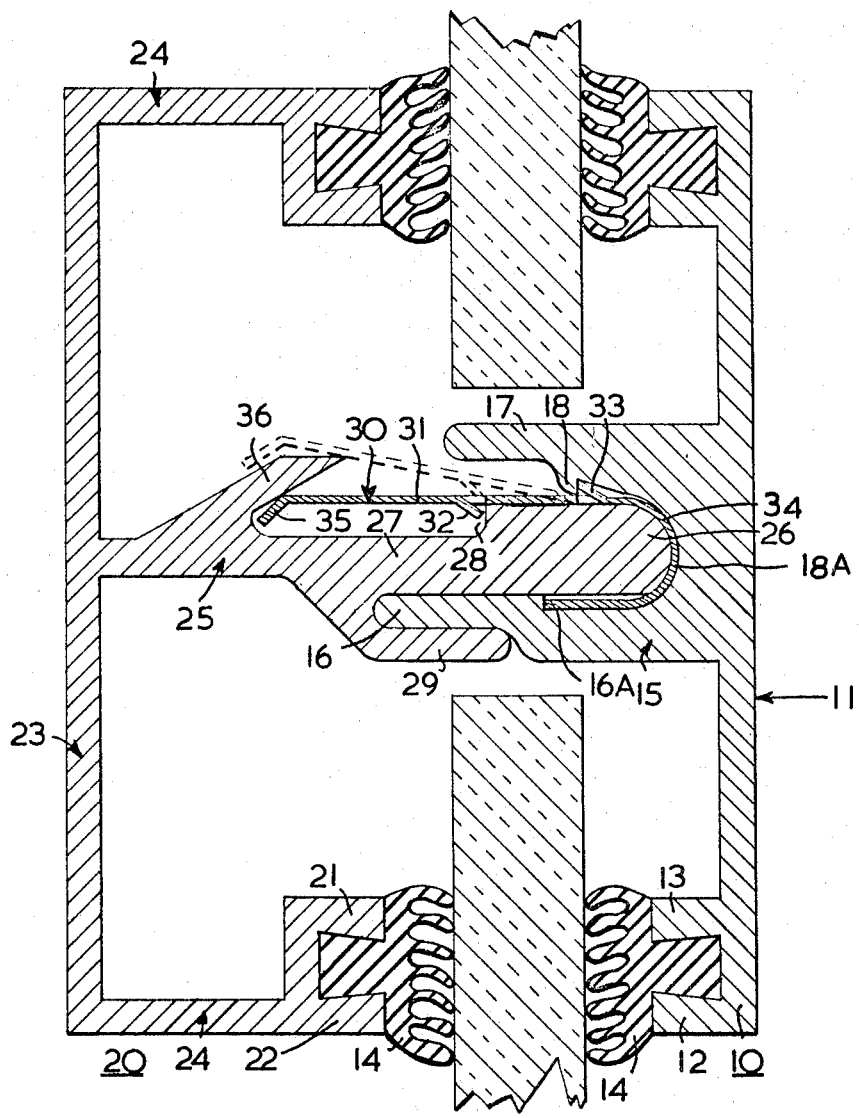
FIG. 1 is a cross-sectional view on an enlarged scale of a multi-part glazing bar in an assembled position.

Referring now to the drawings, shown in FIG. 1 is a glazing bar consisting of a pair of solid, extruded aluminum members 10 and 20 interconnected and retained in an assembled relationship by a clip 30. Each of the members 10 and 20 includes a web forming an outer face and an outwardly directed flange located at each of a pair of opposed marginal edges. Each of the members includes respective ones of a cooperating flange and groove intermediate the marginal flanges for securing the members together. The clip has a portion thereof disposed between the cooperating flange and groove of the members thermally to isolate one from the other to some extent and thereby assist in preventing the formation of condensation on the warmer of the two members in an assembled wall structure.

The extruded member 10, consists of a web 11 terminating at each of the marginal edges in a pair of outwardly directed, closely adjacent, flanges 12 and 13 and a groove formed in a flange 15 located intermediate the marginal edges. Each pair of flanges 12 and 13 form a relatively narrow groove therebetween which retains a gasket or seal 14 of neoprene or the like. The intermediate flange 15 is disposed intermediate the longitudinal marginal edges of member 10 and is substantially normal to the web 11. The flange 15 terminates at its free end in a portion 16 laterally offset and substantially parallel with respect to the main portion. The offset provides a ledge 16A, the purpose of which will become apparent hereinafter.

Spaced from and substantially parallel to the portion 16 is a further portion 17 having an inwardly directed rib or catch member 18. The catch member 18 is in face-to-face relation with the ledge 16A and, as will be seen hereinafter, cooperates with a tab struck outwardly from a clip to aid in retaining the members 10 and 20 in an assembled position. The portions 16 and 17 are substantially parallel to one another and define a groove 18a therebetween.

The member 20 includes a web 23 having a flange 24 projecting therefrom adjacent each of a pair of opposed longitudinal marginal edges and an intermediate flange 25 disposed therebetween. The flanges 24 each terminate in a spaced pair of further flanges 21 and 22 providing a groove to retain a sealing gasket 14. The intermediate flange 25 is disposed substantially normal to the web 23 and is so shaped at its free end as to have a portion fitting in nesting relationship in the groove 18A of the member 10. The flange 25 includes a terminal end portion 26 of substantially uniform thickness throughout a major portion of its length and a reduced portion 27, the junction of such portions providing an abutment ledge 28. Spaced from the portions 26 and 27 is a further flange 29 which together with the intermediate flange forms a substantially U-shaped channel to receive the portion 16 of member 10.

From the foregoing it will be seen that the two intermediate flanges of the respective members 10 and 20 are nested together, in an assembled glazing bar and the glazing bar is retained in an assembled position by the clip 30. The clip includes a central elongated portion 31 having a pair of outwardly directed oppositely disposed struck out tabs 32 and 33. The clip at one end of the elongated portion terminates in a U-shaped portion 34 which overlies the flange terminal end portion 26 of member 20 with the free end abutting the ledge 16A and terminates at the other end of the elongated portion in a bend end portion 35. The struck out tab 33 of the clip engages the protruding rib or catch member 18 to secure the clip 30 to member 10. This securement is facilitated by the abutment of the free end of the clip against the ledge 16A. The tab 32 abuts against the ledge 28 thereby securing the clip to member 20. Such securement of the clip to the respective members retains the members in an assembled position. The entire clip may be made of a resilient material or alternatively at least the tabs may be of a resilient material and the resiliency of the struck-out tab 33 permits assembly of the two members by merely pressing such members together.

In order to retain the clip in position a lock is provided by a flange 36 projecting outwardly from the intermediate flange 25 on the side thereof opposite to that of the flange 29. The flange 36 is located at such a position as to bear against the end 35 of the clip and thereby retain the same in a locked position. The clip, when in the position shown in phantom does not lock the members together and accordingly may be shipped in such positions for later disassembly and then assembly at the site. In the shipping or unlocked position the end 35 of the clip bears against a face of the flange opposite to that occupied when in a locking position. It will be noted that the terminal end of the flange 36 is relatively sharp and accordingly the clip may be positioned such that relatively little misalignment of the members 10 and 20 is necessary for assembly respectively in a locked or unlocked position. The locking flange 36 may be disposed of in the event only the tabs of the clip are resilient.

In order to assemble the members 10 and 20, the clip 30 may be secured to either one of the members whereafter the two members are pressed together by any suitable means. The clip 30 preferably is secured to member 10 before assembly of the members because of the simplicity of attachment thereto. During pressing the members together the resiliency of the tabs 32 and 33 permits them to pass over their respective abutments and immediately upon passing thereover, snap into position to provide a lock.

Clip 30 when attached to member 10 is secured in position by abutment of the free end against the ledge 16A and abutment of the tab 33 and projection 18. Sliding of the clip along member 10 can be prevented by frictional engagement. The member 20 is then positioned by inserting the flange thereof into the U-shaped end portion 34 of the clip 30. The terminal end portion 26 of the intermediate flange engages and bears against the tab 32, however because of the resiliency of such tab, little obstruction or resistance to assembly takes place. Upon further travel, tab 32 abuts against ledge 28 and is locked in position by engagement of the clip end 35 with the locking flange 36.

In an assembled position of members 10 and 20, the flanges 12 and 13 and the flanges 21 and 22 of the respective members are spaced from one another. The two pair of flanges provide a pair of glass receiving recesses in opposed faces of the glazing bar.

In FIGURE 1, the portion 26 of the intermediate flange is shown and is described as being substantially of uniform thickness throughout a major portion of its length but including a reduced or necked down portion 27 to provide a ledge 28.

Figure 2:
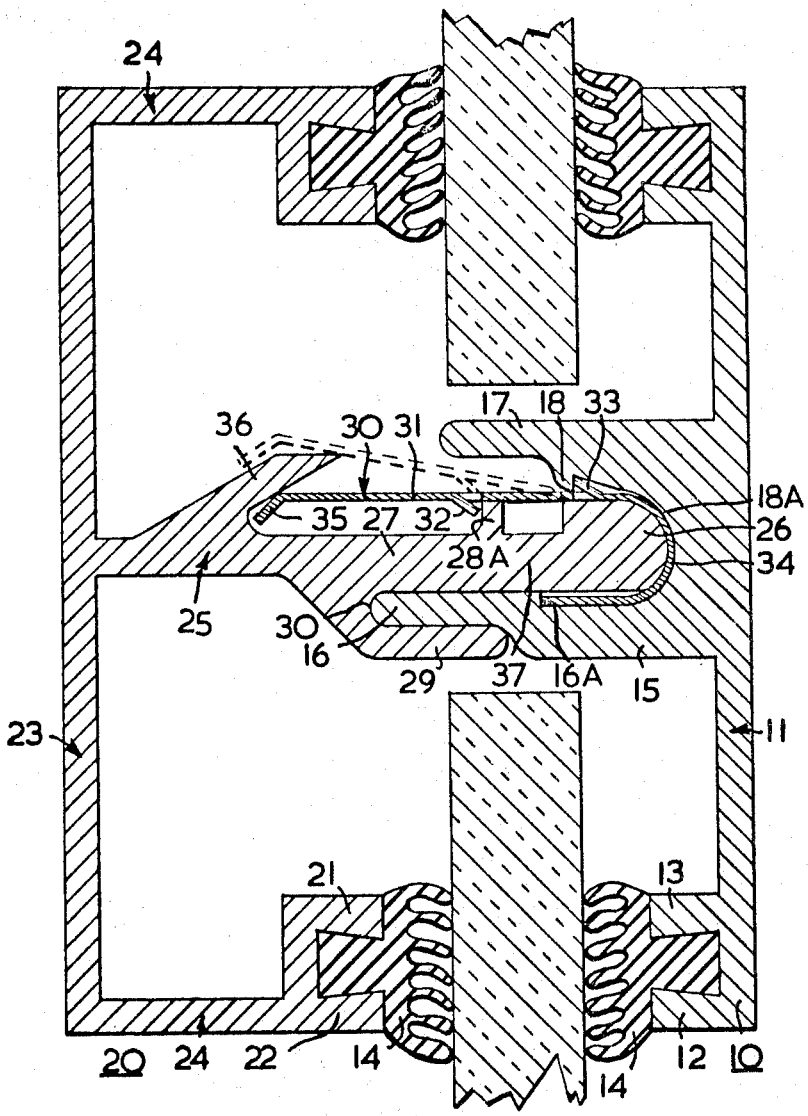
FIG. 2 is similar to FIG. 1 illustrating a modification to the flange in one member which cooperates with a groove in the other member.

In a modified form shown in FIG. 2, there is included a further reduced portion 37 separated from the reduced portion 27 by a flange 28A. The purpose of the reduced portion 37 is to facilitate assembly of the structure by avoiding interference between the tab 32 and the intermediate flange portion 26 when the latter is inserted into the groove of the other member. The flange 28A provides an abutment for the struckout tab 32 of the clip in the same manner as ledge 28 in the FIGURE 1 embodiment.

It will be obvious that the flange 28A may either be continuous throughout the length of the member or alternatively interrupted to provide a plurality of projections, the requisite being that it be of sufficient width to provide an abument for the tab when the members and clip are assembled.

Referring to FIG. 3, shown therein is a modified glazing bar consisting of a pair of solid extruded aluminum members 50 and 60, interconnected by a clip 70 interposed therebetween. The member 50 includes a web portion 51 having a flange 52 disposed at each of a pair of opposed marginal edges thereof. Disposed intermediate the pair of marginal flanges 52 is a further pair of intermediate flanges 53 and 54 located in spaced relation with respect to one another effectively to form a groove 55. The groove 55 includes opposed, generally parallel walls 56 and 57 respectively on flanges 53 and 54 and each wall includes a notch 58 adjacent the free marginal edge of the flange. Each notch includes a wall portion 58A disposed generally parallel to the web of the member and a wall portion 58B sloping toward the base of the groove. The walls 56 and 57 forming the groove each terminate in an outwardly flared portion 59 adjacent the free end of the respective flanges.

The member 60 includes a web 61 with a flange 62 directed outwardly from each of a pair of opposed marginal edges. The space between the flanges 52 and the flanges 62 of the respective members is substantially equal and the flanges 52 and 62 are disposed generaly in alignment and in spaced relationship to provide a pair of glass receiving recesses or grooves A and B at opposed edges of the glazing bar. The member 60 further includes an intermediate flange 63 having a first relatively thin portion 64 terminating at the outer end in an enlarged end portion 65. Located on the portion 64, in spaced relation with respect to the enlarged end, is a pair of ribs 66 defined generally by obliquely disposed walls 66A and 66B. The plane of the wall 66A is substantially parallel but in spaced relation with respect to the plane of the web 61.

The clip 70 is generally U-shaped, consisting of a pair of legs 71 interconnected by a bite portion 72. Each leg 71 includes a tab 73 struck outwardly therefrom with the free end being directed outwardly from the bite portion 72. The tabs 73 are adapted to project into the notches 58 formed in the walls of the groove 55. Each leg of the clip 70 terminates at the free end in an inwardly directed tab 74. The tabs 74 are adapted to bear against the wall 66A of the rib 66 and thereby retain the clip on the intermediate flange of the member 60.

The clip 70 is made of a resilient material such that the tabs 73 readily deform when the members 50 and 60 are assembled by inserting the flange enlarged end portion 65 of member 60 into the groove 55 of the member 50. The width of the enlarged end 65 and the legs of the clip 70 are of similar width so as to form a snug engagement with the walls of the groove such that the members 50 and 60 are supported with their respective flanges 52 and 62 in alignment.

To disassemble the members, a tool 80, shown in phantom, having a hook end 81 is inserted between the panel, which may be a sheet of glass or the like, and one of the marginal flanges 62, 60 such that the hooked end 81 engages the free end of the leg of the clip. The free end thus may be lifted to a position shown in phantom in the upper leg whereby the tab 74 disengages the wall 66A of the rib 66. A similar tool may be used to free the other leg on the opposite side and thereby permit removal of the member 60 from that of member 50. The previously described flared portion 59, on the outer end of the groove, facilitates bending the clip leg such that a sharp bend therein is not necessary to remove the tab from engagement with the rib.

Illustrated in FIG. 4 is a still further modified form of a glazing bar. It may be termed a half section in that, there is only one panel receiving groove or recess. The modified glazing bar consists of solid extruded aluminum members 100 and 200 interconnected by a clip 70. The member 100 includes a web 101 having respective flanges 102 and 103 directed outwardly from opposed marginal edges thereof. Disposed intermediate the marginal edge flanges is a further flange 104 which, together with the flange 103, define a groove 105. The flanges 103 and 104 are substantially parallel with the inner wall of the latter having a notch 106.

The member 200 consists of a web 201 with a pair of generally parallel flanges 202 and 203 disposed in spaced relationship and projecting outwardly therefrom. The flange 202 is substantially in alignment with the flange 102 and is disposed in spaced relationship with respect thereto to define a panel receiving recess. Each of the flanges 202 and 102 terminate at their free end in a seal anchoring groove G adapted to retain a sealing strip S. The groove G is defined by a flange 204 projecting outwardly from the flange 202 and a further flange 205 angularly related with respect thereto. The free end of the flange 202 and the free end of the flange portion 205 each include a lip 206 directed inwardly toward one another and are disposed in spaced relation defining a narrow neck providing entry to the groove G. The sealing strip S includes an arrow head strip anchoring portion consisting of a head H with sloping outer end surfaces J and a stem L the latter being attached to a tubular body K. The sloped outer face of the arrow head portion H bears against the sloping flange 200 and thereby provides means of deflecting the sealing strip inwardly toward the panel received in the recess between the flanges 102 and 202.

The flange 203 of member 200 projects into the groove 105 of the member 100 and includes a plurality of generally parallel ribs 207, 208 and 209. The ribs 208 and 209 are each located in pairs with one of each projecting outwardly from opposite sides of the flange. The ribs 208 and 209 provide a guide whereby the members 100 and 200 are retained with the flanges 102 and 202 substantially in alignment when the members are in an assembled position. In the assembled position, the flange 103 which terminates in a sloped end surface abuts against the web 201 with the sloped end fitting into a groove 201A in the web 201. The ribs 208 include a flattened outer surface portion overlying respective ones of the grooves 106. The purpose of this will become apparent hereinafter. The flange 104 of member 100 is shorter than the flange 103, and, accordingly, is spaced from the web 201 of the member 200. The rib 207 on flange 203 is located in this space.

The clip 70 is secured to the member 100 by a tab 73 formed integral with the clip and projecting outwardly therefrom into the notch 106. A notch 106 also is included in the flange 103 for receiving the tab 73 on the other leg of the clip. Only one rib 207 is included and this provides an abutment for the inwardly turned end portion 74 of the clip and thereby secures the latter to the member 200. The free end portion or tab 74 and the tab 73 as in the previous embodiments retain the two members in an assembled position. Disassembly again may be effected by inserting a tool 80 in the panel receiving recess and engaging the clip with the hook end portion 81 and physically moving the leg end portion of the clip to the position shown in phantom. It is obvious that the ribs 208 and 209 reduce the amount of metal required for the flange 203 and at the same time, provide spaced points of support and thereby retain the assembled members in alignment.

In an alternative form, the flange 103 may be disposed of in place of a similar flange projecting from the web 201 of the member 200. Also, alternatively, the flange 103 may be substantially shorter than that shown so as to abut a similar flange projecting from and formed integral with the web 201 of the member 200.

The half section as described is of a particular use for securing one marginal edge of a panel to the adjacent framework defining an opening for the panel. Intermediate panels may be joined to fill the entire opening by using glazing bars of the type illustrated in FIGS. 1 to 3 wherein there are recesses in each of a pair of opposed faces.

The modified glazing bars illustrated in FIGS. 5 to 8 inclusive include half and full sections of various thickness taken in a direction perpendicular to an assembled wall i.e. normal to the planar surface of a panel retained thereby. The modified forms also permit the use of glazing elements or sheet panels of various thicknesses.

Shown in FIG. 5 is a glazing bar 300 consisting of solid extruded aluminum members 301 and 302 detachably interconnected by a resilient clip 70. The extruded member 301 consists of flanges 303 and 304 disposed at right angles and with the latter connected to a web 305 to provide a generally channel-shaped portion. The extruded section 301 further includes an intermediate flange 306 disposed intermediate the ends of the web 305 and projecting outwardly therefrom in a direction away from the flange 304. The intermediate flange 306 is the same as the flange 203 in the FIG. 4 embodiment. The flange 304 projects outwardly beyond the web 305 in the same direction as the intermediate flange 306 and terminates at its free end in a seal anchoring channel G identical to that described in detail with respect to FIG. 4. A short flange or lug 308 parallel to and in spaced relationship with respect to flange 304 extends outwardly from the web 305 and provides a groove 309, the purpose of which will be explained hereinafter.

The extruded member 302 is generally similar to the extruded member 100 described in detail with reference to FIG. 4 but additionally includes an open channel similar to that formed by the web 305 and flanges 303 and 304 of member 301. The member 302 consists of a web 310 having a spaced pair of parallel flanges 311 and 312 projecting outwardly therefrom to define a groove 313. A flange 314, parallel to flanges 311 and 312 extends laterally beyond the web on opposite sides thereof. The flange 314 terminates at one end in a seal retaining groove G and at the other end in a flange 315 disposed at right angles thereto. The web 310, and a portion of flange 314 and flange 315 together define an open channel. Effectively, the modified glazing bar illustrated in FIG. 5 is the same as that illustrated in FIG. 4 but additionally includes open channels R and S defined by flanges extending laterally beyond the main portion of the member. These open channels may be of various widths whereby the glazing bars may be adapted to be connected to various thicknesses of a wall structure.

FIG. 6 illustrates a glazing bar substantially identical to that of FIG. 5 differing in that the channels are closed by flanges 316 and 317 to become enclosed chambers or boxes on respective ones of the extruded members. Each of the flanges 316 and 317 terminate in seal anchor grrooves G disposed in spaced relation and as shown the glazing bar is a full section—i.e. a pair of glazing recesses, one being located on each of a pair of opposed faces of the member. The glazing bar in FIG. 5 is utilized to connect a panel or curtain wall to a brick, stone or other solid wall structure whereas the glazing bar in FIG. 6 is closed on all sides and is used to interconnect a pair of panels in a curtain wall.

Figures 7, 8:
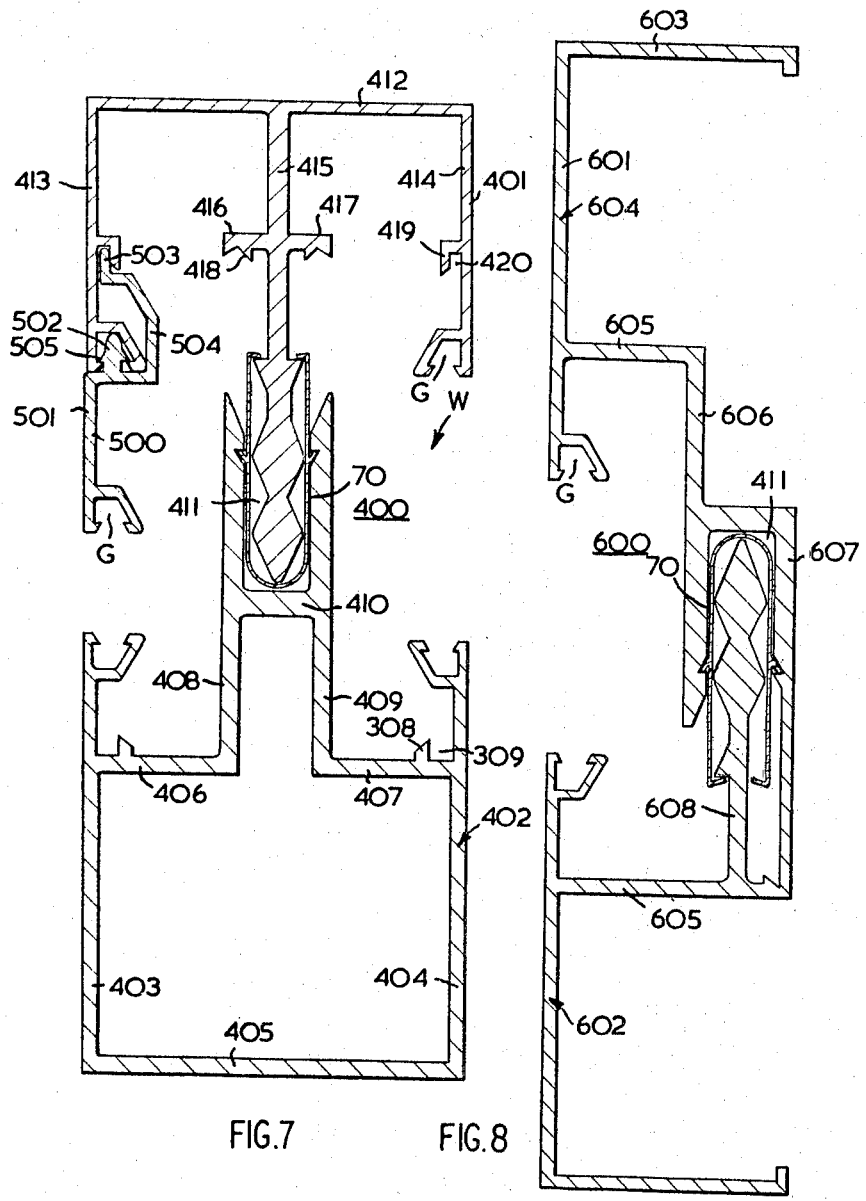
FIG. 7 is a cross-sectional view on an enlarged scale of a still further modified glazing bar in an assembled position.
FIG. 8 is a cross-sectional view on an enlarged scale of a still further modified form of a multi-part glazing bar.

The glazing bar illustrated in FIG. 7 includes various modifications whereby the channels on opposed faces may be varied in width to accommodate various thicknesses of panels. Illustrated in FIG. 7 is a glazing bar 400 consisting of solid extruded aluminum members 401 and 402 detachably interconnected by a resilient clip 70. The solid extruded member 402 consists of a pair of flanges 403, 404 extending outwardly from a web 405 to form a generally U-shaped member in cross-section, flanges 403 and 404 being parallel and connected to opposed marginal edges of the web 405. One end of each of the flanges 403 and 404 terminate in a seal anchoring channel G identical to that described with reference to FIG. 4. Intermediate the ends of respective ones of the flanges 403 and 404 are intermediate flanges 406 and 407 directed inwardly toward one another and effectively forming a second web. A rib or flange 308 extends outwardly from each flange 406 and 407 adjacent respectively flanges 403 and 404 to provide a pair of grooves 309. Flanges 408 and 409 extend outwardly from respective intermediate flanges 406 and 407 in planes generally parallel to the flanges 403 and 404. The flanges 408 and 409 are interconnected intermediate their ends by a further flange 410 thereby defining a groove 411 to receive an intermediate flange of the other solid extruded member to be described hereinafter.

The inner surfaces defining the grorove 411 include opposed notches or grooves for receiving tabs of the resilient clip in the same manner as described with reference to FIGS. 3 and 4. Effectively, the groove 411 is extended outwardly beyond the seal anchoring grooves. In this manner, one means has been provided whereby the glazing bar accommodates various thicknesses of panels. The solid extruded member 401 consists of a web 412 having spaced parallel flanges 413 and 414 extending outwardly from the opposed marginal edges thereof. An intermediate flange 415 extends in the same direction from the web 412 and terminates in an enlarged portion disposed outwardly beyond seal retaining grooves G in the terminal ends of the flanges 413 and 414. The enlarged outer end is the same as that described in detail with reference to FIG. 4.

Intermediate the enlarged outer end and the flange 412 is a pair of oppositely directed flanges 416 and 417 each having a V-shaped groove 418 in the face adjacent the enlarged outer end of the intermediate flange. Each of the flanges 413 and 414 also has an L-shaped flange 419 extending inwardly from the inner surface to provide a groove 420. The purpose of this groove will become apparent hereinafter. The flanges 403 and 404 of the extruded member 402 are disposed in alignment and in spaced relationship with respect to flanges 413 and 414 of the extruded member 401. The space between the respective pairs of flanges on the members 401 and 402 provide grooves for receiving the marginal edges of a pair of adjacent panels. As illustrated in FIG. 7, a relatively wide groove W is provided on the right-hand portion of the glazing bar.

A solid extruded element 500 consisting of a flange 501 and a pair of spaced tabs 502 and 503 interconnected by a portion 504 provides means whereby the width of the panel receiving groove may be varied. The flange 501 terminates at its free end in a seal anchoring channel G. The tab 502 includes a pair of oppositely outwardly directed lugs 505 engageable with ledges formed in the seal receiving groove G of an extruded member. The tab 503 is received in the groove 420 and the filler or solid extruded element 500 is thereby anchored to the section 401 to provide a panel receiving groove X relatively narrower than the groove W on the other side of the glazing bar. Alternatively the element 500 may be secured to the member 402 in which case the groove for the panel is located at a position nearer to the web 412.

A modified filler element 501' is shown in FIG. 9 which is similar to that shown in FIG. 8. In the filler element 501' the seal receiving groove G is replaced by a flange 506 disposed normal to the flange 501 adjacent the free end thereof. A V shape in cross section rib 507 extends along the length of the element and projects outwardly therefrom. A similar filler element may be used to eliminate one of the panel grooves. A filler element 501' (see FIG. 9) may be used for example with the glazing bar illustrated in FIG. 6 to close one of the panel receiving grooves. The lugs 503 and 502 in such case would project respectively into grooves 309 and G, thereby anchoring the filler element at a pair of spaced positions. The V shaped rib would project into the neck of the groove G on the member 302. In an assembled position the flanges 304, 501 and 314 would be coplanar.

A still further form of glazing bar is illustrated in FIG. 8. Shown therein is a glazing bar 600 consisting of solid aluminum extruded members 601 and 602 detachably interconnected by a resilient clip 70. Each member consists of a pair of flanges 603 and 604 disposed at right angles to one another. The flange 604 in each member terminates at its outer or free end in a seal anchoring groove G. Each member further includes a flange 605 extending outwardly from the flange 604 at a position intermediate the flange 603 and the seal anchoring groove G. The member 601 includes a groove 411 defined by a flange 606 secured to the flange 605 and an L-shaped flange 607 secured to the flange 606. The member 606 includes a flange 608 having an enlarged outer end, similar to that in the other embodiments, for insertion into the groove 411. The flange 608 is secured to and projects outwardly from the flange 605. In the modified glazing bar illustrated in FIG. 8 one face is open for abutting against and anchoring to a solid wall structure.

Shown in FIG. 11 is a modified seal 800 consisting of an arrow shaped anchoring strip having a head H joined to a resilient body 801 by a narrow stem L. The head H includes a pair of sloped outer surfaces J intersecting substantially along the median of the seal. The opposite side of the body includes a concave surface 802 for engaging a flat planar surface of the panel.

The seal illustrated in FIG. 11 and the seal illustrated in FIG. 4, are adapted for anchoring in a seal groove G, as shown and described in detail with reference to FIG. 4. The arrow head H is retained by the relatively narrow neck of the groove and the sloped surface J is disposed in sliding contact with the adjacent surface of the sloped flange 205. This sliding contact permits movement of the seal relative to the anchoring groove so as to prevent deforming the seal as much during insertion of a panel as would be the case where the anchoring portion is not movable. The sliding contact also urges the seal generally into contact with the panel.

The clip 70 utilized in interconnecting the extruded sections is resilient and preferably consists of a thermal insulating material. In the embodiments illustrated in FIGS. 4 to 8, the clip has a U-shaped portion interposed between the glazing bar members and thereby at least partially thermally isolates one from the other. The clip 70 may consist of a resilient relatively hard plastic such as polyvinyl chloride or the like or alternatively it may consist of a spring steel member coated with an insulating material such as polyvinyl chloride or the like. In the event thermal insulating qualities are not required, the clip may consist of steel or some other resilient material. The entire clip preferably is resilient; however, it may also be rigid except for the tabs struck outwardly therefrom which deform during assembly of the glazing members.

The glazing bars of the type for example illustrated in FIG. 6 may be interconnected at right angles to one another to form a grid by a plurality of clips 900. The clip as shown in FIG. 12 consists of a pair of L-shaped legs 901 interconnected by a cross bar 902.

I claim:
1. A glazing bar comprising:
 (a) a first rigid member having;
  (1) a first web; and,
  (2) a first flange projecting outwardly therefrom
 (b) a second rigid member having;
  (1) a second web; the latter including;
  (2) a pair of spaced generally parallel flanges thereon defining a groove adapted to receive an end portion of said first flange;
  (3) a notch in at least one of the adjacent surfaces of the flanges defining said groove;
 (c) a clip interconnecting said first and second members, said clip having;
  (1) a first portion disposed within said groove with a tab struck outwardly therefrom to engage said notch in the groove; and,
  (2) a second portion having a tab projecting therefrom engaging a stop member on said first flange, said first and second rigid members each having a second flange with such second flanges being disposed substantially in alignment and in spaced relation to one another to provide a panel receiving recess therebetween.

2. A glazing bar as defined in claim 1 wherein said clip is made of a resilient, thermo insulating material.

3. A glazing bar as defined in claim 2 wherein said clip is formed of polyvinylchloride.

4. A glazing bar as defined in claim 1 wherein the first flange of said first member includes a plurality of generally parallel spaced ribs engageable with walls defining the groove.

5. A glazing bar as defined in claim 1 wherein at least one of the walls defining the groove for receiving the end portion of the first flange is sloped to provide a generally wedging action in receiving the end portion of the flange during assembly of the members.

6. A glazing bar comprising:
 (a) a first rigid member having;
  (1) a web; and,
  (2) a first flange projecting outwardly therefrom
 (b) a second rigid member having;
  (1) a web; and,
  (2) a groove therein to receive an end portion of said first flange;
  (3) a notch in at least one of the walls defining said groove; and said groove being defined by a pair of flanges projecting from the web of said second member, one of said pair of flanges being located at the marginal edge of said web and projecting therefrom to abut the web of said first member, said other flange of the pair of flanges including said notch, the glazing bar further having;
 (c) a clip interconnecting said first and second members, said clip having;
  (1) a first portion disposed within said groove with a tab struck outwardly therefrom to engage said notch in said other flange;
  (2) a second portion having a tab projecting therefrom engaging a stop member on said first flange, said first and second rigid members each having a second flange disposed substantially in alignment and in spaced relation to provide a panel receiving recess therebetween.

7. A glazing bar comprising:
 (a) a first rigid member having;
  (1) a web,
  (2) a first flange directed outwardly therefrom; and,
  (3) a second flange projecting outwardly from said web from the same side thereof as said first flange and disposed in spaced relationship with respect thereto,
 (b) a second rigid member having;
  (1) a web,
  (2) a first flange directed outwardly therefrom; and
  (3) a groove on the same side of the web as said first flange and disposed in spaced relationship with respect thereto, said second flange of the first member projecting into the groove of said second member in nested relationship with the first flanges of the members directed in a direction toward one another and spaced to provide a panel receiving groove therebetween; and,
 (c) a clip detachably securing said first and second members together wtih said clip having;
  (1) a first portion disposed within said groove with a first deformable tab directed outwardly therefrom and projecting into a notch in said groove; and,
  (2) a second portion extending outwardly from said grooves, said second portion including a tab engaging a detent on the first member, said first and second tabs being so directed as to restrain relative movement of the clip and the second and first members respectively thereby to retain said members in an assembled position.

8. A glazing bar comprising:
 (a) a pair of rigid members each substantially E-shaped in cross-section having;
  (1) a web terminating at each of a pair of opposed marginal edges thereof in a flange directed outwardly therefrom, said members each having,
  (2) a similarly directed intermediate flange disposed between said marginal flanges, said intermediate flange terminating at the outer free end thereof in a recess and the other member including a flange portion projecting into said recess; and,
 (b) a clip detachably securing said members together, said clip having one end portion thereof disposed in said recess between said members and having a pair of oppositely directed protruding portions abutting a portion of respective ones of said members to retain the same in an assembled position.

9. A glazing bar comprising:
 (a) a first rigid substantially E-shaped in cross-section member having;
  (1) a web terminating at each of a pair of opposed marginal edges in a flange directed outwardly therefrom; and,
  (2) an intermediate flange disposed therebetween,
 (b) a second member having;
  (1) a web terminating at each of a pair of opposed marginal edges in a flange directed outwardly therefrom; and,
  (2) a groove having a notch in the surface thereof disposed therebetween, said marginal flanges of the respective members being disposed in spaced relation to provide a pair of spaced panel receiving recesses, said intermediate flange of first member projecting into the groove of said second member in nested relationship therewith; and
(c) a resilient clip interposed between and detachably securing said first and second members together in assembled relationship, said clip having;
   (1) a first portion disposed within said groove with a first tab struck outwardly therefrom and projecting into a notch in said groove; and
   (2) a second portion extending outwardly from said groove, said second portion including a second tab engaging a rib on the intermediate flange of said first member.

10. A glazing bar comprising:
(a) a first rigid member substantially E-shaped in cross-section having;
   (1) a web;
   (2) a pair of flanges projecting respectively outwardly from opposed marginal edges of said web; and
   (3) an intermediate flange disposed between said marginal flanges and projecting outwardly therebeyond;
(b) a second rigid member generally E-shaped in cross-section having;
   (1) a pair of flanges projecting respectively from opposed marginal edges thereof; and
   (2) a pair of intermediate flanges disposed between said marginal edge flanges in spaced relation with respect to one another along the web to provide a groove therebetween; and
(c) a resilient at least partially thermo insulating clip interposed between and interconnecting said first and second members, said clip having;
   (1) a first portion disposed within said groove with a tab struck outwardly therefrom in a direction towards the other member and engaging a notch in said groove; and
   (2) a second portion having a tab projecting outwardly therefrom in the opposite direction and engaging a ledge on the intermediate flange of said first member, said first member including a further pair of flanges located one on each side of said intermediate flange and cooperating therewith to form a pair of grooves, one of said grooves receiving at least an end portion of one of the flanges projecting from the second member and the other flanges providing a lock to retain a free end of said clip in an assembled position; said first and second rigid members having the marginal edge flanges thereof disposed substantially in alignment and in spaced relationship to provide a pair of spaced, panel-receiving recesses therebetween.

11. A glazing bar comprising:
(a) a first rigid member having;
   (1) a web;
   (2) a spaced pair of flanges extending outwardly therefrom and each terminating in a panel abutting edge;
   (3) a second web interconnecting said flanges intermediate the ends thereof;
   (4) an intermediate flange secured to said second web and extending outwardly therefrom in the same direction as said pair of flanges and disposed at a position therebetween;
(b) a second rigid member having;
   (1) a first web;
   (2) a pair of spaced flanges secured to and extending outwardly from said web and terminating in a panel abutting edge;
   (3) a second web interconnecting said pair of flanges at a position intermediate the ends thereof;
   (4) an intermediate flange secured to and extending outwardly from said second web in the same direction as said flanges and disposed at a position therebetween, said intermediate flange having a groove in the end thereof to receive the intermediate flange of said first rigid member;
(c) a resilient clip interconnecting said first and second rigid members, said clip having;
   (1) a first portion disposed within the groove in the intermediate flange of the second member and having at least one tab struck outwardly therefrom to engage a notch in said groove;
   (2) a second portion having a tab projecting outwardly in a direction opposite to that of said first tab and engaging a ledge on the intermediate flange of said first member and thereby detachably interconnecting said first and second members in an assembled relationship, the pairs of flanges on said first and second members being disposed in spaced aligned relationship to provide a pair of panel receiving grooves in opposed faces to said glazing bar.

12. A glazing bar as defined in claim 11 including an additional element detachably securable to one of said rigid members and having a portion extending toward the other section within the panel receiving groove thereby to vary the width of said groove.

13. A glazing bar as defined in claim 11 including an additional rigid member detachably securable to the flange of one of said rigid members at a pair of spaced positions and having an extending portion coplanar with said flange and extending therefrom in a direction toward the other member and thereby vary the width of the panel receiving groove of said glazing bar.

14. A glazing bar comprising:
(a) a first rigid member having;
   (1) a first flange;
   (2) a second flange connected to said first flange and disposed in a plane substantially normal thereto;
   (3) a third flange, parallel to said first flange and secured to said second flange intermediate the longitudinal marginal edges thereof;
   (4) a fourth flange, parallel to said second flange and disposed in spaced relation with respect thereto;
(b) a second rigid member having;
   (1) a first, second, third and fourth flange arranged similarly to those of the first member;
   (2) a fifth flange parallel to said fourth flange and spaced therefrom to provide a groove, to receive the fourth flange of the first member projecting into the groove of the second member and having the second flanges of said members in alignment and spaced to provide a panel receiving groove; and
(c) a resilient clip interconnecting said first and second members, said resilient clip having;
   (1) a first U-shape portion disposed within said groove;
   (2) at least one tab struck outward from said U-shaped portion and engaging a notch in the wall of said groove thereby anchoring said clip to said second mmeber;
   (3) a terminal end portion projecting beyond the groove; and
   (4) a tab struck outwardly from the terminal end portion engaging a rib on said first member thereby anchoring said clip thereto, the tabs on the respective clip portions being directed toward one another thereby locking said glazing bar in an assembled position.

15. A panel securing assembly comprising; first and second elements having marginal edges defining therebetween a panel receiving and engaging recess, at least one of said elements having adjacent its marginal edge a sealing strip engaging groove, said one element also having groove defining means spaced from said sealing strip engaging groove, and an adapter element to effectively decrease the width of said panel engaging and receiving recess comprising, a flange having one free marginal edge, and a tab connected adjacent the opposite marginal edge thereof, said tab having lug means thereon with said tab being engaged by said lug means within the sealing strip engaging groove of said one of said elements, and a further tab spaced from said first mentioned tab and extending in generally the same direction as the latter, said further tab being arranged to enter the groove defining means of said one element, and means for rigidly securing said further tab to said flange.

References Cited
UNITED STATES PATENTS

| | | | |
|---|---|---|---|
| 2,867,856 | 1/1959 | Cupini | 52—731 |
| 3,016,993 | 1/1962 | Owen | 52—397 |
| 3,081,849 | 3/1963 | Hubbard | 52—498 |
| 3,196,998 | 7/1965 | Owen | 52—731 |
| 3,221,465 | 12/1965 | McKee | 52—397 |

REINALDO P. MACHADO, *Primary Examiner.*